Patented July 5, 1938

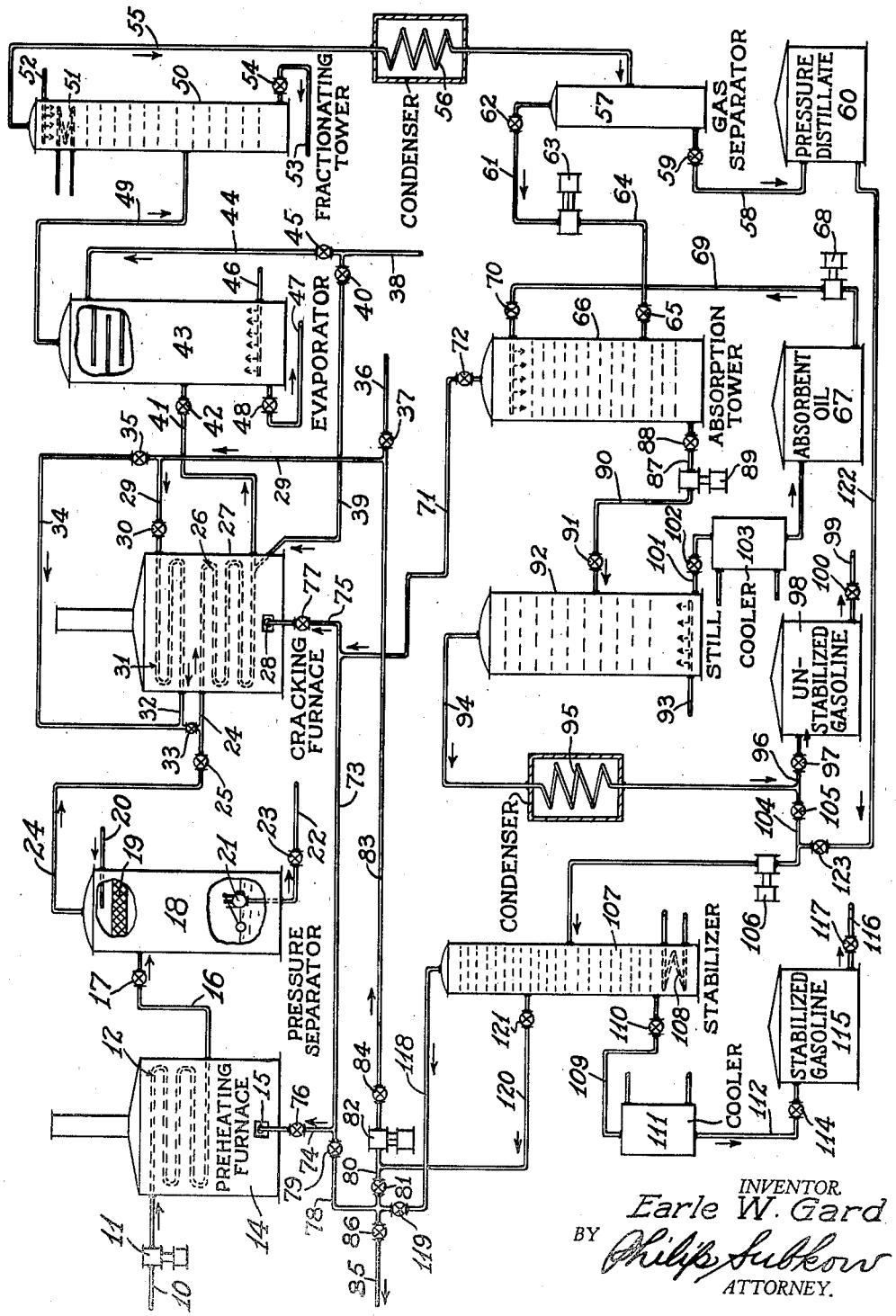

2,122,881

UNITED STATES PATENT OFFICE 2,122,881

METHOD FOR VAPOR PHASE CRACKING OF OIL

Earle W. Gard, Palos Verdes Estates, Calif., assignor to Union Oil Company of California, Los Angeles, Calif., a corporation of California Application December 6, 1932, Serial No. 645,889

5 Claims. (Cl. 196—9)

This invention relates to a process for cracking oil in the vapor phase. The invention specifically relates to a process for preparing vapors prior to cracking in the vapor phase. One of the important features of this invention resides in the drying of the vapor generated from an oil prior to its cracking in the vapor phase.

It is well known to crack hydrocarbon oils in the vapor phase by preheating the oil in a coil under pressure to a temperature above the boiling point of certain fractions desired to be cracked in the vapor phase, flashing the preheated oil into a separating drum to produce a separation of vapors and oil and subsequently passing the vapors so separated through a high temperature vapor phase cracking coil. In this process of preheating the oil and flashing it into the separating drum, it is well known that the vapors so produced are saturated, that is, they contain large quantities of entrained liquid particles. The degree of saturation depends upon the temperature and pressure of separation as well as upon the design of the separating apparatus. However, no matter how efficient the separation may be, the vapor will be saturated as long as there is liquid production at the same time, that is, when the vapors are separated in the presence of either unvaporized liquid or condensate produced during vapor separation. When these saturated vapors are cracked in the vapor phase they must be first dried before reaching the high temperature cracking coils or considerable amounts of carbon will be deposited in the cracking tubes.

Many operators in the petroleum refining industry have attempted to overcome this difficulty by passing the saturated vapors through superheating tubes to effect drying of the vapors. These merely constitute a plurality of tubes which are heated at high temperature in order to distill the heavy liquid entrained particles causing the saturation of the vapors. The high temperature distillation results in a deposition of coke in the drying tubes. The amount of coke deposited in the drying or superheating tubes regulates to a great extent the running time on the furnace, since if the vapors are properly dried before reaching the cracking zone very little carbon will be deposited in the cracking tubes.

It is, therefore, an object of my invention to correct the aforementioned difficulties and disadvantages attending prior methods of vapor phase cracking. It is a further object of my invention to insure the passage of liquid free vapor through the vapor phase cracking coils.

The method that I have invented to overcome this difficulty is simple and easy to apply. It is a known fact to those skilled in the art that the mixture of light hydrocarbons with heavier ones will permit the distillation of the heavier ones to take place at a temperature lower than that required to distill the heavy fractions by themselves, i. e. without the presence of light fractions. The use of steam and gases will produce the same result when mixed with the heavy fractions. In addition, the mixture of a gas and liquid under certain conditions of temperature and pressure will cause the entire amount of liquid to be transformed into a vapor. I have made use of these principles in my invention to effect the drying of the saturated vapors prior to their cracking in the vapor phase.

Briefly stated, my invention resides in a process and apparatus for cracking oils in the vapor phase which includes the step of introducing a gas or vapor into the saturated vapors under conditions sufficient to vaporize the entrained liquid particles causing saturation of the vapors prior to cracking the vapors in the vapor phase. An important feature of my invention resides in the introduction of light hydrocarbon gases or vapors into the saturated vapors at a temperature sufficient to vaporize the entrained liquid particles but below the cracking or coking point of the saturated vapors.

More specifically, my invention includes the steps of heating an oil at a temperature sufficient to vaporize the fraction desired to be cracked in the vapor phase in a subsequent cracking operation, passing the heated oil into a vaporizer to separate the desired fraction from the undesired liquid fraction, drying the vaporized fraction by the regulated introduction of light hydrocarbon gases or vapors at a temperature sufficient to distill the entrained liquid particles causing saturation of the vapors but at a temperature below the cracking or coking point of the saturated vapors and subsequently cracking the vapors in the vapor phase.

Thus, such gases or vapors may be injected into the saturated vapors as the waste dry gases from an absorption plant or the light hydrocarbons such as propane and butane from the stabilizing operation of unstabilized absorption gasoline, or the vapors of unstabilized gasoline, or the extremely light liquid fractions produced in the stabilization of absorption gasoline or pressure distillate. Such gases and/or vapors will permit the distillation of the heavy entrained liquid particles causing the saturation of the vapors at a much lower temperature than that required to distill these products by themselves. In other words, if the saturated vapors were passed through superheating or drying tubes without injection of light hydrocarbon gases, the temperature required to dry the vapors is considerably higher than when the gases are injected into the vapors to effect the drying action. In fact, the temperature necessary to dry the vapors is above the cracking temperature of the heavy fractions so that considerable quantities of coke are deposited in the drying or superheating tubes.

In addition to the drying effect of the light hydrocarbon gases on the saturated vapors, these light fractions will, by mass reaction, reduce the formation of further quantities of these light hydrocarbons during the vapor phase cracking operation and thus it is possible to obtain an increased yield of the light desirable fraction, i. e., gasoline. Moreover, where hydrocarbons, such as propane, butane, iso-butane, pentane and hexane or mixtures thereof, are used as drying agents, these will crack while passing the vapor phase cracking coils into heavier desirable fractions within the gasoline boiling range and also into fixed gases which will suppress the formation of fixed gases from the dried vapors, i. e., the original cracking stock.

The invention will be better understood by reference to the drawing which shows schematically the preferred form for carrying out the process. In the drawing, oil which may be in the nature of fuel oil, gas oil, or kerosene distillates, is forced through line 10 by pump 11 through the preheating coils 12 situated in the furnace 14 heated by burner 15. The preheated oil is then passed through pressure regulating valve 17 in line 16 into the pressure separator or vaporizer 18 provided, if desired, with mist extractors 19 such as tiles washed with an oil fraction having a composition similar to the evolved vapors introduced through line 20. The mist extractors 19 are provided for the purpose of removing as much of the entrained liquid particles as possible causing saturation of the vapors. The heavy unvaporized fractions of the oil are drawn out through line 21 controlled valve 21 and are passed via line 22 controlled by valve 23 to a further cracking furnace for viscosity reduction or to a storage tank not shown. The saturated vapors are withdrawn from the vaporizer 18 through line 24 provided with a pressure regulating valve 25 and are passed through the vapor phase cracking coils 26 situated in a furnace 27 heated by burners 28.

Very light hydrocarbons, preferably highly heated natural gas or such fractions as butane, propane or iso-butane are introduced into line 29 controlled by valve 30 from an absorption plant hereinafter described and are passed through heating coils 31 also situated in the cracking furnace 27 and then through line 32 controlled by valve 33 into line 24 as shown to dry the saturated vapors from the vaporizer 18. The coil 31 may be separately fired, if desired. A portion of the gases introduced into line 29 may be by-passed into line 34 controlled by valve 35 and are mixed with the gases from the heating coil 31 in order to control their temperature prior to admixture with the vapors from the vaporizer 18. Any other suitable gas or liquid that upon being vaporized will not form coke or similar material may be used by pumping the material through line 36 controlled by valve 37 into the lines 29 and 34.

Oil of any desired type and at a proper temperature may be pumped through line 38 into line 39 controlled by valve 40 into the terminal portion of the vapor phase cracking coil 26 in order to suddenly cool or douse the vapors and gases and thus dissolve those fractions that would otherwise form coke and also to agglomerate any fixed carbon formed in the cracking. The mixture of doused vapors and gases and dousing oil is then passed via line 41 controlled by valve 42 into the evaporator 43 where a separation of vapors and liquid is effected. In the evaporator, the gases and vapors are partially fractionated by pumping the desired oil passed into line 38 into the evaporator via line 44 controlled by valve 45. If desired, superheated steam or gas may be introduced into the bottom of the evaporator via line 46 to aid in the stripping of the condensate generated in the evaporator. The heavy liquid collected at the bottom of the evaporator is drawn out through line 47 controlled by valve 48 and may be passed to a storage tank not shown. The uncondensed vapors and gases are passed into the fractionating tower 50 via vapor line 49. In the tower, the vapors and gases are fractionated by means of reflux condensate condensed from the vapor by means of cooling coil 51 and/or the regulated introduction of gasoline through line 52 into the tower produced by condensation of the gasoline vapors exiting the tower. Gas oil or cycle stock material is drawn from the tower through line 53 controlled by valve 54, while the fractionated gasoline vapors and so-called fixed gases flow via line 55 through condenser 56 into a separator 57 where the gasoline is drawn out through line 58 controlled by valve 59 and passed to storage tank 60. As stated previously, a portion of this gasoline may be passed into the top of the fractionating column via line 52 to aid in the fractionation of the vapors.

The gases containing absorption gasoline fractions leave the gas separator 57 via line 61 controlled by valve 62 and are compressed, if necessary, by compressor 63 and the gases under pressure are passed through line 64 controlled by valve 65 into the absorption tower 66. Cold, lean absorbent oil from tank 67 is pumped by pump 68 through line 69 controlled by valve 70 into the top of the absorption tower 66 to pass countercurrent to the compressed gases introduced at the bottom of the tower. The fixed dry gases leave the tower via line 71 controlled by valve 72 and are passed into the line 73 and then into lines 74 and 75 controlled by valves 76 and 77, respectively, to be burned at burners 15 and 28 of furnaces 14 and 27, respectively. A portion of these gases may be passed into line 78 controlled by valve 79 and then into line 80 controlled by valve 81 to compressor 82 and the compressed gases may then be passed into line 29 via line 83 controlled by valve 84, or the gases in line 78 may be passed to a gas holder not shown via line 85 controlled by a valve 86.

The rich oil is pumped from the bottom of the absorption tower 66 through line 87 controlled by valve 88 by means of pump 89 into line 90 controlled by valve 91 to a still 92. In the still, the oil is heated by steam introduced via line 93 or by other suitable means in order to distill all of the gasoline fractions absorbed in the oil which pass from the still via line 94 through condenser 95 into line 96 controlled by valve 97 and thence into tank 98. This unstabilized gasoline may be withdrawn from the tank 98 via line 99 controlled by valve 100 to be stored and used, or a portion may be pumped into line 36.

The hot lean oil at the bottom of still 92 is withdrawn via line 101 controlled by valve 102, cooled in cooler 103 and is then passed into absorbent oil tank 67 to be recycled to the absorption tower for absorption of further quantities of gasoline fractions from the gases.

If desired, the unstable gasoline condensed in 95 may be passed into line 104 controlled by valve 105 and pumped by pump 106 into a stabilizer 107. Here the unstable gasoline is fractionated under proper control so that only the desired stable gasoline is withdrawn from the bottom of the stabilizer. Heat is applied by means of steam or other heating gas circulated through coil 108. The stable gasoline is withdrawn from the stabilizer via line 109, cooled in cooler 111, passed into line 112 controlled by valve 114 and into tank 115. The gasoline may then be withdrawn from tank 115 via line 116 controlled by valve 117.

The gases separated from the stabilization of the unstabilized gasoline in stabilizer 107 and comprising propane, butane and iso-butane fractions are taken from the stabilizer through line 118 controlled by valve 119 and then passed through line 85 to other uses or they may be introduced into line 80 and then passed to the compressor 82 as before described. If desired, a portion of the extremely light liquid fractions in the stabilizer 107 may be withdrawn via line 120 controlled by valve 121 and passed into line 29 via lines 80 and 83 as before mentioned. I have shown line 120 as connecting line 80 so that the liquid must pass through the compressor 82. However, line 120 may be connected to line 83 at a point intermediate compressor 82 and valve 84 or the line 120 may be connected directly to line 36.

The pressure distillate or cracked gasoline in tank 60 may be passed into line 122 controlled by valve 123 and pumped by pump 106 into the stabilizer 107 for separation of light fractions which may be passed into line 29 in the manner before described.

The operation of the process will be explained below with reference to a specific example given by way of illustration.

Assuming an operation on California gas oil having a gravity of 27.8° A. P. I. and an average boiling point of 547° F., the oil is pumped through the preheating coils 12 under from 200 to 2000 lbs. pressure. In these coils, it may be either merely heated to a distillation temperature at the pressure to be maintained in the pressure separator or vaporizer 18, i. e., to about 700° F., or it may be heated above the distillation temperature to get some cracking, that is, to about 800° F. Assuming that the process is operated to merely vaporize the oil in 18, it will be sufficient that the oil is pumped through coils 12 at such pressure as to maintain in the vaporizer 18 an autogenous pressure of about 500 to 750 lbs., controlled by the pressure valves as previously described. If, however, cracking is to occur, a pressure of about 1000 to 1500 lbs. is maintained in the coils 12. However, the preferred amount of cracking is such that not more than 20% conversion to gasoline occurs in the coils, it having been found that under these conditions, coils 12 are practically uncarbonized and in view of the fact that the additional cracking is to occur in the vapor phase, it is inadvisable to carry this liquid phase cracking in coils 12 beyond a certain point. The oil passes through pressure regulating valve 17 into the vaporizer 18. The autogenous pressure in this vaporizer will vary from 300 lbs. up to the higher pressure maintained in coils 12 and the temperature of the oil may be from 600° F. upward. However, it has been found advisable when operating on a gas oil wherein the conversion is not much higher than 20% or where there has been no conversion in coils 12 to maintain a pressure of about 500 to 750 lbs. The pressure in the vaporizer may be controlled by means of a pressure regulating valve 25. If desired, the pressure in the vaporizer may be maintained sufficiently high to effect a separation of only the 20% converted gasoline when the preheating is carried out to effect this conversion together with the light gas oils produced or originally present in the gas oil so that upon subsequent conversion of the separated vapors, a high anti-knock gasoline is produced.

In the vaporizer, vapors and liquids are separated due to the contained heat in the preheated oil. The vapors since being produced in the presence of liquid are saturated with entrained liquid particles and are at a temperature where coking will not take place to any degree but are not sufficiently hot to superheat themselves. These vapors flow into the line 24 and through pressure regulating valve 25 and then contact the drying gases constituting very light hydrocarbons, preferably highly heated, i. e., to above 700° F., introduced into the line from the heating coils 31.

The drying gases may comprise natural gas or such fractions as butane, propane and isotutane, or vapors of very light oils which do not coke when distilled. The mixture of these gases or vapors which do not coke when distilled with the saturated vapors beforementioned will cause the heavy fractions causing saturation of the vapors to be distilled at temperatures below the coke forming point and at a much lower temperature than that required to distill the heavier fractions by themselves, such as by passing them through superheating coils. This action may be varied by controlling the temperature, pressure and amount or character of the material injected into the vapors either together or independent of each other. The temperature of the gases injected into the vapors may be controlled by introducing into the gases prior to contact with the vapors a proper quantity of cooler gases by-passed around the heating coils 31 as previously described and the temperature of the gases injected into the vapors may vary between 700° F. and a temperature insufficient to crack the saturated vapors upon contact and admixture. By providing mist extractors in the vaporizer, a substantial portion of the liquid particles causing saturation will be separated, thus requiring the introduction of less amounts of drying gases to effect the distillation of the entrained liquid particles. The mist extractors are ineffectual to remove substantially all of the entrained liquid particles.

By choosing the proper material to be injected, such as the waste dry gases from the absorption plant and/or the light hydrocarbons such as propane, butane and iso-butane from the stabilizing operation, the formation of these lighter fractions from the feed stock will be reduced by mass reaction in the vapor cracking zone and it is thus possible to obtain an increased yield of the desirable gasoline fractions. It is preferable to employ such fractions as propane, butane and iso-butane, i. e., the gases escaping from the stabilizer or a light liquid fraction from the stabilizer as hereinafter described, as the drying agents for the saturated vapors for the reason that these materials will crack into heavier fractions such as gasoline in the vapor phase cracking zone and into fixed gases such as methane and ethane which will, by mass reaction, prevent the formation of fixed gases from the vapors produced in the vaporizer.

The mixture of vapors and gases now free from coke forming constituents, i. e. entrained liquid particles, are led to the vapor phase cracking coils 26 where the vapors are heated at high temperatures, i. e., from 800 to 1200° F. The pressure in the coils may be regulated by means of valve 42.

When the oil has passed from the vapor phase cracking coils, it is immediately contacted with a stream of oil as, for instance, the oil passing into lines 38 and 39. The purpose of this injected oil is to partially cool the vapors to about 600 to 800° F., preferably about 700° F. so that they may undergo rectification in the evaporator 43 and also to agglomerate any fixed carbon or dissolve tars which have been generated in the cracking process and also to prevent further cracking of the vapors by their contained heat. If desired, the heat of the vapors may act additionally to crack the injected oil as, for example, when a substantially low refractory oil is employed as the dousing medium.

The mixture of doused vapors and gases and liquid oil at a temperature of about 700° F. passes through valve 42 into the evaporator 43 where a separation of gases and vapors from liquid is effected. Liquid oil is introduced into the top of the evaporator via lines 38 and 44 to fractionate the vapors. If desired, superheated steam may be passed into the bottom of the tower to aid in the stripping of the condensate generated in the evaporator. The vapors and gases cooled to a temperature of approximately 625° F. in the evaporator are introduced into the fractionating tower 50 via line 49 where the vapors undergo fractionation by the regulated introduction of cooling oil comprising cracked gasoline from tank 60 or from other sources introduced into the tower via line 52 and passed countercurrent to the flow of vapors in the tower. The refluxing action may be substituted or aided by circulating cooling water or other cooling medium through coil 51 so that the desired end point gasoline is removed through line 55 which is condensed in 56 and passed into the gas separator 57 where the cracked gasoline or pressure distillate is drawn through line 58 and passed to storage tank 60.

The condensate at the bottom of the tower 50 comprises substantially the gas oil or cycle stock introduced through line 10 and may be recirculated as feed stock to the coils 12. The residuum collecting at 43 will be a cracked residuum constituting heavy ends produced in coil 26 plus the heavy ends of the dousing oil. It is withdrawn through line 47 and passed to storage.

The residue collecting at the bottom of vaporizer 18 will be in the nature of a road oil which may be cracked to produce a low viscosity, high gravity oil by a cracking operation which does not form a part of this invention and will not be further described.

The gases containing absorption gasoline fractions are treated for the recovery of absorption gasoline by any conventional absorption process, such as by compressing the gases and passing them into the absorption tower 66 countercurrent to cold, lean absorbent oil pumped from tank 67 into the top of the tower to pass countercurrent to the compressed gases. The rich absorption oil is then distilled in still 92 to separate gasoline vapors which are condensed in 95 to produce an unstabilized gasoline. This unstabilized gasoline may then either be passed to tank 98 or to the stabilizer 107 or a portion may be introduced into line 29 via line 36 and passed through the heating coil 31 to produce a vapor for drying the saturated vapors. In the stabilizer, the unstable gasoline is fractionated under proper control so that only the desirable stable gasoline is withdrawn from the bottom of the stabilizer which is then cooled in cooler 111 and passed to tank 115.

The gases separated from the absorption tower 66 may be used at burners 15 and 28 or a portion thereof may be compressed in compressor 82 and passed into the line 29 for drying the saturated vapors as previously described. The light fractions separated in stabilizer 107 and comprising propane, butane and iso-butane fractions may also be compressed in compressor 82 and passed into the line 29 as previously described. Excess gases produced at either or both the absorption tower and stabilizer may be passed to a gas holder via line 85.

If desired, the pressure distillate collecting in tank 60 may be pumped into the stabilizer 107 to separate extremely light fractions from the pressure distillate such as propane, butane and iso-butane which may be passed into line 29 via lines 118, 80 and 83. When it is desired to pass light liquid fractions such as iso-butane, pentane and hexane from the stabilizer via side line 120 into line 29, it is preferable to pass the gases produced in the stabilizer to other uses and also the excess gases from the absorber 66 which are not employed as fuel at burners 15 and 28. This may be accomplished by closing valve 81 and opening valves 79, 81 and 86. These light liquid fractions will vaporize by reduction of pressure while passing through the valves on lines 120, 83 and 29 and by-pass line 34 when a portion is by-passed to control the temperature of the gases passing from heating coils 31. The liquid will also vaporize while passing through the heating coils 31.

The above description is not to be taken as limiting my invention but as merely illustrative of one mode of carrying it out and many variations may be made thereon as will be recognized by those skilled in the art which are within the scope of this invention which I claim to be:

1. A process for the pyrolytic formation of high anti-knock gasoline which comprises commingling oil and a recycled normally gaseous hydrocarbon fraction of the character hereinafter defined which is substantially free of fixed hydrocarbon gases of less than three carbon atoms formed during the herein mentioned pyrolytic conversion of the commingled oil and hydrocarbon fraction and which hydrocarbon fraction is at a temperature insufficient to substantially crack the oil upon said commingling of the oil and hydrocarbon fraction, subjecting the mixture of said commingled oil and hydrocarbon fraction to pyrolytic conversion in the vapor phase for a period of time sufficient to pyrolytically convert said mixture into a cracked vapor containing high anti-knock gasoline and into fixed hydrocarbon gases of less than three carbon atoms, separating the cracked vapor resulting from said pyrolytic conversion into stable gasoline, fixed hydrocarbon gases of less than three carbon atoms and a normally gaseous hydrocarbon fraction which is substantially free both of fixed hydrocarbon gases of less than three carbon atoms and hydrocarbons of more than six carbon atoms which were formed during said aforesaid pyrolytic conversion of said commingled oil and hydrocarbon fraction and returning said normally gaseous hydrocarbon fraction as said first mentioned recycled normally gaseous hydrocarbon fraction for commingling with oil for pyrolytic conversion.

2. A process for the pyrolytic formation of high anti-knock gasoline which comprises commingling oil and a hydrocarbon fraction comprising hydrocarbons of three and four carbon atoms which fraction has been separated from the hereinafter mentioned cracked vapor by separating and removing from said cracked vapor issuing from the cracking zone substantially all of the hydrocarbons of less than three carbon atoms present in said cracked vapor and formed by cracking said commingled oil and hydrocarbon fraction in said cracking zone and also by separating and removing high anti-knock gasoline from said cracked vapor and which first mentioned hydrocarbon fraction prior to said commingling is at a temperature insufficient to substantially crack the oil upon said commingling of the oil and said hydrocarbon fraction, subjecting the mixture of oil and hydrocarbon fraction to pyrolytic conversion in the vapor phase for a period of time sufficient to pyrolytically convert said mixture into a cracked vapor containing high anti-knock gasoline hydrocarbons and hydrocarbons lighter than said gasoline hydrocarbons, separating and removing from said cracked vapor a hydrocarbon fraction containing substantially all of the hydrocarbons of less than three carbon atoms formed during said pyrolytic conversion of said commingled oil and said first mentioned hydrocarbon fraction and also separating and removing stable high anti-knock gasoline from said cracked vapor and thereby producing said first mentioned hydrocarbon fraction containing the hydrocarbons of three and four carbon atoms as a fraction separate from said separated gasoline and from all of said separated fraction of hydrocarbons of less than three carbon atoms and returning said hydrocarbon fraction containing hydrocarbons of three and four carbon atoms for said first mentioned commingling with oil for pyrolytic conversion.

3. A process for the pyrolytic formation of high anti-knock gasoline which comprises commingling oil and a recycled normally gaseous hydrocarbon fraction of the character hereinafter defined which is substantially free of fixed hydrocarbon gases formed during the herein mentioned pyrolytic conversion of the commingled oil and hydrocarbon fraction and which hydrocarbon fraction is at a temperature insufficient to substantially crack the oil upon said commingling of the oil and hydrocarbon fraction, subjecting the mixture of said commingled oil and hydrocarbon fraction to vapor phase cracking for a period of time sufficient to pyrolytically convert said mixture into high anti-knock gasoline and into fixed hydrocarbon gases of less than three carbon atoms, separating the products from said pyrolytic reaction into pressure distillate and fixed hydrocarbon gases of less than three carbon atoms, separating said pressure distillate into a stable gasoline and a gaseous fraction substantially free both of fixed hydrocarbon gases of less than three carbon atoms and hydrocarbons of more than six carbon atoms which were formed during said aforementioned pyrolytic conversion of said commingled oil and hydrocarbon fraction, and returning said normally gaseous hydrocarbon fraction as said first mentioned recycled normally gaseous hydrocarbon fraction for commingling with oil for pyrolytic conversion.

4. A process according to claim 1 in which the oil is first vaporized before being commingled with said recycled normally gaseous hydrocarbon fraction.

5. A continuous process for the pyrolytic formation of high anti-knock gasoline which comprises continuously commingling oil and hydrocarbon fraction which has been separated from the hereinafter mentioned cracked vapor in the manner hereinafter defined and which hydrocarbon fraction is at a temperature insufficient to substantially crack the oil upon said commingling of the oil and the hydrocarbon fraction, subjecting the mixture of oil and hydrocarbon fraction to pyrolytic conversion in the vapor phase for a period of time sufficient to pyrolytically convert said mixture into a cracked vapor containing high anti-knock gasoline hydrocarbons and hydrocarbons lighter than said gasoline hydrocarbons, separating and removing from said cracked vapor a portion of the gasoline hydrocarbons, passing an absorption menstruum in contact with the remaining cracked gases to absorb substantially all of the gasoline hydrocarbons and hydrocarbons of three and four carbon atoms contained in said cracked gases and to separate as an unabsorbed fraction substantially all of the hydrocarbons of less than three carbon atoms formed during said pyrolytic conversion of said commingled oil and said first mentioned hydrocarbon fraction, separating and removing said unabsorbed fraction of hydrocarbons of less than three carbon atoms from the absorption menstruum, separating and removing from said absorption menstruum the gasoline hydrocarbons and the hydrocarbons of three and four carbon atoms, separating hydrocarbons of three and four carbon atoms from the gasoline hydrocarbons and thereby producing a stable high anti-knock gasoline and said first mentioned hydrocarbon fraction containing the hydrocarbons of three and four carbon atoms and returning said hydrocarbon fraction containing the hydrocarbons of three and four carbon atoms for said first mentioned commingling with oil for pyrolytic conversion in cycles of operation.

EARLE W. GARD.

CERTIFICATE OF CORRECTION.

Patent No. 2,122,881.  July 5, 1938.

EARLE W. GARD.

It is hereby certified that error appears in the printed specification of the above numbered patent requiring correction as follows: Page 5, second column, line 10, claim 3, for the word "gaseous" read normally gaseous hydrocarbon; and that the said Letters Patent should be read with this correction therein that the same may conform to the record of the case in the Patent Office.

Signed and sealed this 13th day of September, A. D. 1938.

Henry Van Arsdale (Seal) Acting Commissioner of Patents.